Patented Jan. 24, 1939

2,144,830

UNITED STATES PATENT OFFICE 2,144,830

THERAPEUTIC PREPARATION

Frank Breed and Lewis E. Harris, Lincoln, Nebr., assignors to Norden Laboratories, a corporation of Nebraska No Drawing. Application April 15, 1937, Serial No. 137,025

5 Claims. (Cl. 167—68)

Our invention relates to therapeutic products, one of our objects being the provision of an injection preparation for restoring the normal calcium-phosphorus level of the blood stream.

Another of our objects is the provision of a calcium-phosphorus preparation which may be injected directly into the blood stream and which is substantially free from toxic and irritant properties.

Another object which we have in view is the provision of a stable calcium-phosphorus solution which is free at all temperatures from solid particles in suspension and which is suitable for intravenous, intramuscular, or subcutaneous injection.

An important object of our invention is the provision of a method for stabilizing a solution of a calcium-phosphorus preparation.

Blood analyses in recent years have demonstrated that many of the disorders in both humans and the lower animals are associated with a lowered mineral balance in the blood stream. Of the minerals in the blood stream, calcium is by far the most prominent with the result that the clinical efforts have been directed to increasing the calcium content of the blood by injection. At first the chloride salt of calcium was used but this was soon discarded because of an irritant effect on animal tissues. The calcium salt finally adopted is the gluconate but this requires stabilization in concentrated solution. Such stabilization has been brought about by means of aluminum chloride as described in Patent No. 2,043,211.

The prominent position of calcium in the blood stream drew the attention of investigators away from some of the other minerals, particularly phosphorus. While the calcium ration was highly successful in the great majority of cases, there were cases in which the calcium failed to give results even though the blood analysis indicated no calcium deficiency. In other cases the calcium gave only temporary results, falling back to its ratio with phosphorus at the lower mineral level. The organism seems to be balanced to maintain a fairly constant ratio between the calcium and phosphorus content of the blood. It had been known that in the blood stream of any given individual, the ratio between calcium content and phosphorus content is substantially constant regardless of the mineral level. For example, a milk cow shows a lower calcium-phosphorus level than the same cow when dry and the calcium-phosphorus level is even lower when the cow suffers from milk fever. Regardless of the mineral level, however, the calcium content and the phosphorus content of the blood stream in the cow will be in the approximate ratio of 2 to 1.

In our preparation we employ calcium glycerophosphate to supply the necessary phosphorus to the blood stream. Our difficultly has been that calcium glycero-phosphate is not soluble at room temperatures to any appreciable extent in water, coupled with the fact that only solutions of considerable concentrations can be employed for the purpose. Not only is the calcium glycerophosphate practically insoluble except when hot but, so far as we are aware, no single reagent has yet been discovered for stabilizing a hot aqueous solution of calcium glycerophosphate so that it will remain in solution at very low temperatures or even at room or blood temperatures. Furthermore, no method whatever appears to have been known prior to our discovery for effecting such stabilization of calcium glycerophosphate solutions.

The calcium is introduced into the blood stream by means of the aqueous solution of calcium gluconate stabilized with the aluminum chloride. We have found that new product is formed by the interaction of the aluminum chloride and the calcium gluconate and that this new product will react with the calcium glycerophosphate to render the calcium glycerophosphate more soluble and to stabilize the solution. We therefore employ the calcium glycerophosphate as a source for both the calcium and the phosphorus by combining it with a solution of calcium gluconate which has been stabilized by means of aluminum chloride, the calcium gluconate providing an additional source of calcium.

What takes place in the mixture of calcium gluconate, calcium glycerophosphate, and aluminum chloride is probably an initial reaction between the calcium gluconate and the aluminum chloride followed immediately by a reaction involving the calcium glycerophosphate. In the mass the two reactions are almost simultaneous. Because of this we are enabled to produce our stabilized solution under a large number of varying conditions. Our preferred method is to add 5 parts by weight of aluminum chloride to 80 parts of boiling water and then to add, while the solution is still hot, 7.5 parts of calcium gluconate and 7.5 parts of calcium glycerophosphate which are dissolved with agitation. After a clear solution is obtained there should be added water to make up for evaporation losses to make a final product of 100 parts. The process may be varied by adding 7.5 parts of each of calcium gluconate and calcium glycerophosphate to 80 parts of boiling water and then adding 5 parts of aluminum chloride while the solution is still hot. When the solution becomes clear, enough water is added to make 100 parts of the final product. It is also possible to add the three solids in the indicated proportions to 80 parts of boiling water under agitation and to then add the required amount of water after the solution is clear. The process may be carried out either by heating under vacuum or by heating under pressure. It is also possible to produce the same product by adding the solids to cold water and then bringing the water to the boiling point. The stabilized solution may be evaporated either to more concentrated solution or dryness for convenience in transportation and storage to be made available for use by the mere addition of the required amount of water. The calcium-phosphorus solid resulting from the above described process is readily soluble in water. A preservative should be added for preventing bacterial action or mold growth.

In describing our process we have made special reference to aluminum chloride but we wish to lay claim to all chemical equivalents of the aluminum chloride in their relation to the calcium gluconate and calcium glycerophosphate. The aluminum chloride has the advantage of ready availability but our experiments have demonstrated that aluminum bromide, aluminum nitrate, aluminum citrate, aluminum borate, and normal aluminum acetate have a similar effect to that of aluminum chloride in the stabilization of the calcium gluconate and calcium glycerophosphate.

Our product and its preparation is characterized by the fact that the reaction between the calcium gluconate and the aluminum compound results in a heretofore unknown product which in turn reacts with the calcium glycerophosphate to provide the only known calcium-phosphorus therapeutic preparation which is stable at all temperatures and concentrations and which is readily available for use.

While we describe the preparation of a product having a calcium-phosphorus ratio of 2 to 1 to correspond with the calcium-phosphorus ratio in the blood stream, it will be obvious that this ratio may be varied at will to meet special requirements by simply altering the ratio of calcium gluconate relative to the calcium glycerophosphate.

Having thus described our invention in such full, clear, and exact terms that its composition and utility will be readily understood by others skilled in the art to which it pertains, what we claim as new and desire to secure by Letters Patent of the United States is:

1. A new therapeutic injection agent consisting of substantially equal parts by weight of calcium gluconate and calcium glycerophosphate in aqueous solution of over 6%, said solution being stabilized by means of a soluble aluminum compound and having a calcium-phosphorus ratio of substantially two parts of calcium to one part of phosphorus.

2. The process of stabilizing a supersaturated solution of calcium glycerophosphate which consists in dissolving not less than 3 parts by weight of each of calcium gluconate and calcium glycerophosphate in not more than 93 parts of hot water and in the presence of a soluble aluminum compound as a stabilizer.

3. The process of preparing a soluble dry mixture of calcium and phosphorus in the ratio of two-to-one to be dissolved in water for injection into the blood stream to restore the normal calcium-phosphorus balance thereof, said process consisting in dissolving substantially 3 parts by weight of each of calcium gluconate and calcium glycerophosphate in the presence of substantially 1 part of a soluble aluminum compound, and in then evaporating the said solution to dryness to be subsequently dissolved in water to make a stable solution of a concentration greater than 6%.

4. The process of preparing a new calcium and phosphorus therapeutic agent which consists in dissolving 3 parts by weight of each of calcium gluconate and calcium glycerophosphate in hot water to a concentration greater than 6% with the addition of not less than 1 part by weight of a soluble aluminum compound as a stabilizer for the solution on cooling.

5. The process of making a new calcium and phosphorus therapeutic agent which consists in dissolving from 3.5% to 25% of calcium gluconate and 2% to 25% of calcium glycerophosphate in from 94.4% to 35% of water with the addition of from 1% to 15% of aluminum chloride, all by weight.

FRANK BREED.
LEWIS E. HARRIS.